United States Patent [19]

Boerder

[11] Patent Number: 5,121,553
[45] Date of Patent: Jun. 16, 1992

[54] TABLE SAW GAUGE

[75] Inventor: Eugene F. Boerder, Dallas, Tex.
[73] Assignee: E. F. Boerder Company, Dallas, Tex.
[21] Appl. No.: 724,132
[22] Filed: Jul. 1, 1991
[51] Int. Cl.⁵ .............................................. B27G 23/00
[52] U.S. Cl. ...................................... 33/640; 33/403; 33/465
[58] Field of Search .................. 33/626, 633, 634, 640, 33/641, 403, 424, 465, 471, 628, 534, 535, 202, 403

[56] References Cited

U.S. PATENT DOCUMENTS

| | | |
|---|---|---|
| 2,632,483 | 3/1953 | Jamack . |
| 2,649,780 | 8/1953 | Anderson .................. 33/832 X |
| 3,070,887 | 1/1963 | Olsen . |
| 3,205,586 | 9/1965 | Mullen . |
| 3,628,496 | 12/1971 | Schmitt . |
| 4,443,950 | 4/1984 | Cockeram . |
| 4,779,354 | 10/1988 | Hill . |

Primary Examiner—Harry N. Haroian
Attorney, Agent, or Firm—Michael A. O'Neil

[57] ABSTRACT

A table saw gauge includes a body positionable on the table top of a table saw and having a first scale for determining the saw blade height, a second scale for determining the saw blade angle, and a third scale for determining the distance from the saw blade to an adjacent fence. A blade is pivotally supported on the body and includes a first armature for engaging the uppermost tooth of the saw blade to determine saw blade height and second armature engageable with the side of the saw blade to determine saw blade angle. Pointers mounted on the body will aid cooperation with the first and second scales mounted on the body to indicate the height of the saw blade and the angle of the saw blade, respectively.

9 Claims, 12 Drawing Sheets

TABLE SAW GAUGE

TECHNICAL FIELD

This invention relates generally to measuring and gauging devices, and more particularly to a device useful in conjunction with a table saw for quickly and accurately determining the height of the saw blade, the angle of the saw blade and the distance between the saw blade and an adjacent fence.

BACKGROUND AND SUMMARY OF THE INVENTION

Table saws are widely used by professional carpenters, homeowners, hobbyist and the like to perform a variety of woodworking tasks ranging from rough cross cutting and ripping to the fabrication of finished articles. According to one estimate, more than seventy million table saws are in use in the United States. Notwithstanding such widespread usage, there does not presently exist a gauge for quickly and accurately determining the various perimeters which are essential to the proper use of a table saw, including the height of the saw blade above the table top, the angle of the saw blade relative to the table top, and the distance between the saw blade and an adjacent fence or guide.

The present invention comprises a table saw gauge that fulfills the foregoing need. In accordance with the broader aspect of the invention, a table saw gauge includes a body having a base adapted for engagement with the table top of a table saw to position the gauge. A blade is pivotally supported on the body and is provided with two armatures, one for engaging the teeth of a table saw blade to determine the height of the blade above the table top, and the other for engaging the side of a table saw blade to determine the angle between the blade and the table top. The body is provided with two scales, and the blade is provided with two pointers adapted for cooperation with the scales to measure blade height and blade angle. The body is provided with a third scale useful in determining the distance between the saw blade and an adjacent fence or guide.

BRIEF DESCRIPTION OF THE DRAWINGS

A more complete understanding of the invention may be had by reference to the following Detailed Description when taken in conjunction with the accompanying drawings, wherein.

DETAILED DESCRIPTION OF THE DRAWINGS

Figure 1:
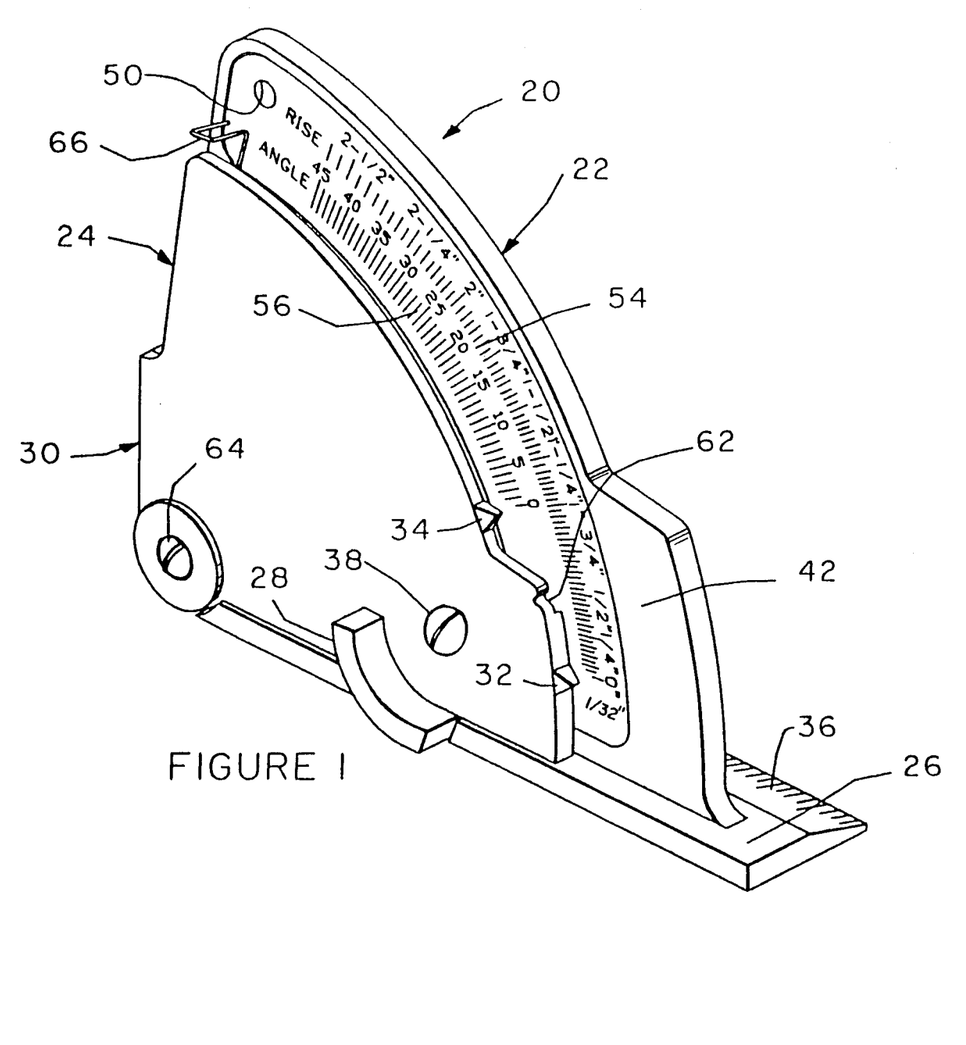
FIG. 1 is a perspective view of the table saw gauge incorporating the invention.

Referring now to the Drawings and particularly to FIG. 1 thereof, there is shown a table saw gauge 20 incorporating the preferred embodiment of the invention. The table saw gauge 20 includes a body 22 and a blade 24 pivotally supported on the body. The body 22 includes a base 26 adapted for engagement with the table top of a table saw to position the table saw gauge 20 relative to the blade of the table saw. The body and blade of the table saw gauge are preferably made from one of the many common plastic materials which are currently used in the manufacture of tools, hardware and the like. Conventional injection molding techniques may be used to fabricate the body and the blade. Those skilled in the art will appreciate the fact that the invention is not limited to the foregoing materials. The component parts of the table saw gauge of the present invention may be made from any desired material including steel, aluminum or other metals using conventional metal working techniques. Additionally, glass and other ceramics may be used.

The blade 24 includes a first armature 28 adapted for engagement with the teeth of a table saw blade to determine the height of the blade above the table top. The blade 24 further includes a second armature 30 extending at less than a 90° angle from the table surface. The second armature 30 is adapted to engage the side of a table saw blade to determine the angle between the table saw blade and the table top of the saw. The blade 24 further includes a first pointer 32 adapted for cooperation with a first scale on the body 22 to determine the height of the table saw blade and a second pointer 34 adapted for cooperation with a second scale on the body 22 to determine the angle between the table saw blade and the table top. The body 22 is also provided with a scale 36 useful in determining the distance between the table saw blade and an adjacent fence or guide.

Figure 2:
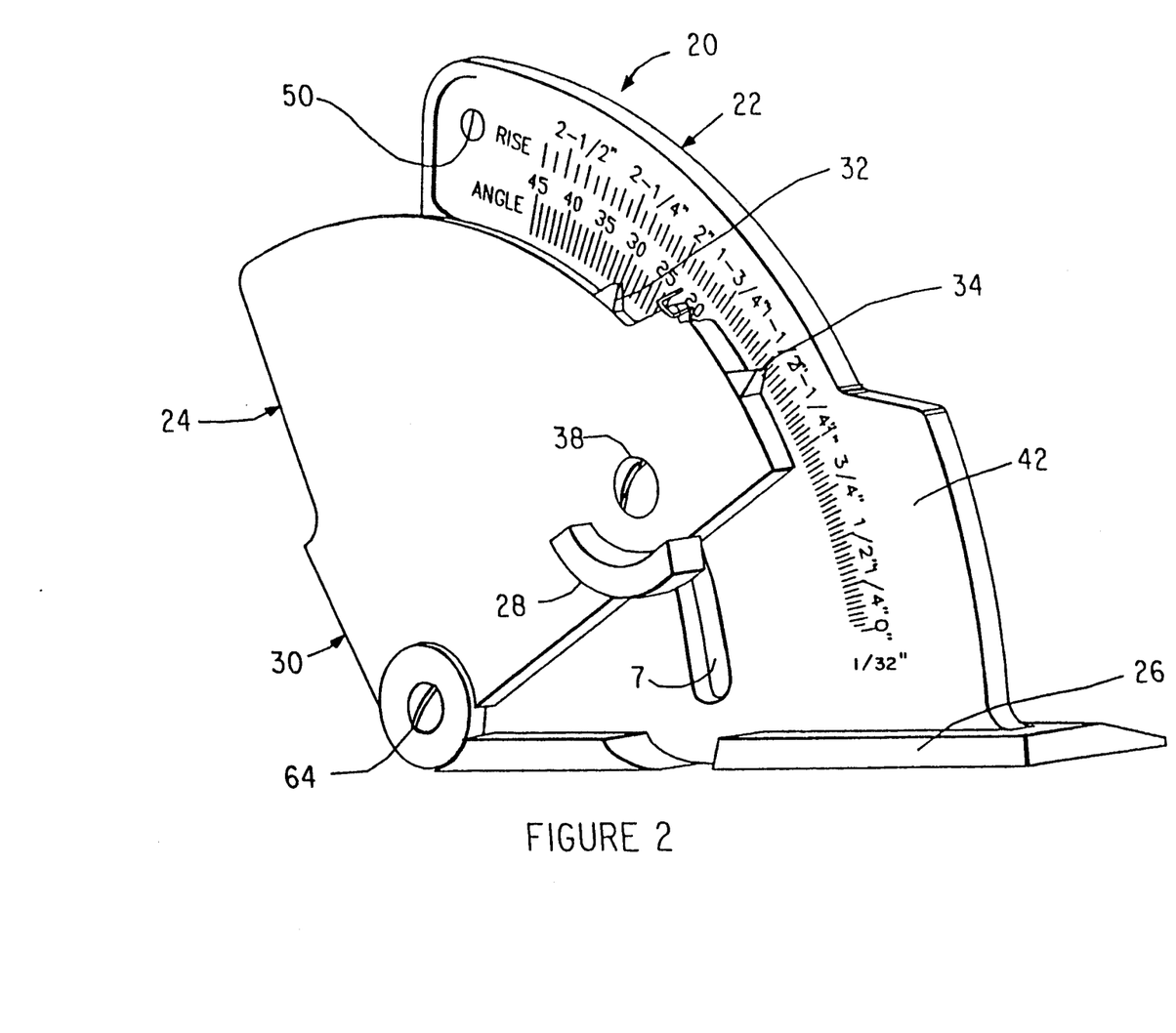
FIG. 2 is a perspective view of the table saw gauge of FIG. 1 showing the blade of the gauge in a raised position.

The table saw gauge 20 of FIG. 1 is further illustrated in FIG. 2. The body 22 is provided with a arcuate slot 37. A threaded fastener 38 is mounted on the blade 24 and extends through the slot 37 of the body 22. A nut 39 (FIG. 4) cooperates with the threaded fastener 38 to secure the blade 24 in a desired angular relationship relative to the body 22. This feature is useful in positioning either the armature 28 or the armature 30 in a predetermined location in order to allow movement of the saw blade to a desired height and/or to a desired angular relationship relative to the table top of the table saw.

Figure 3:
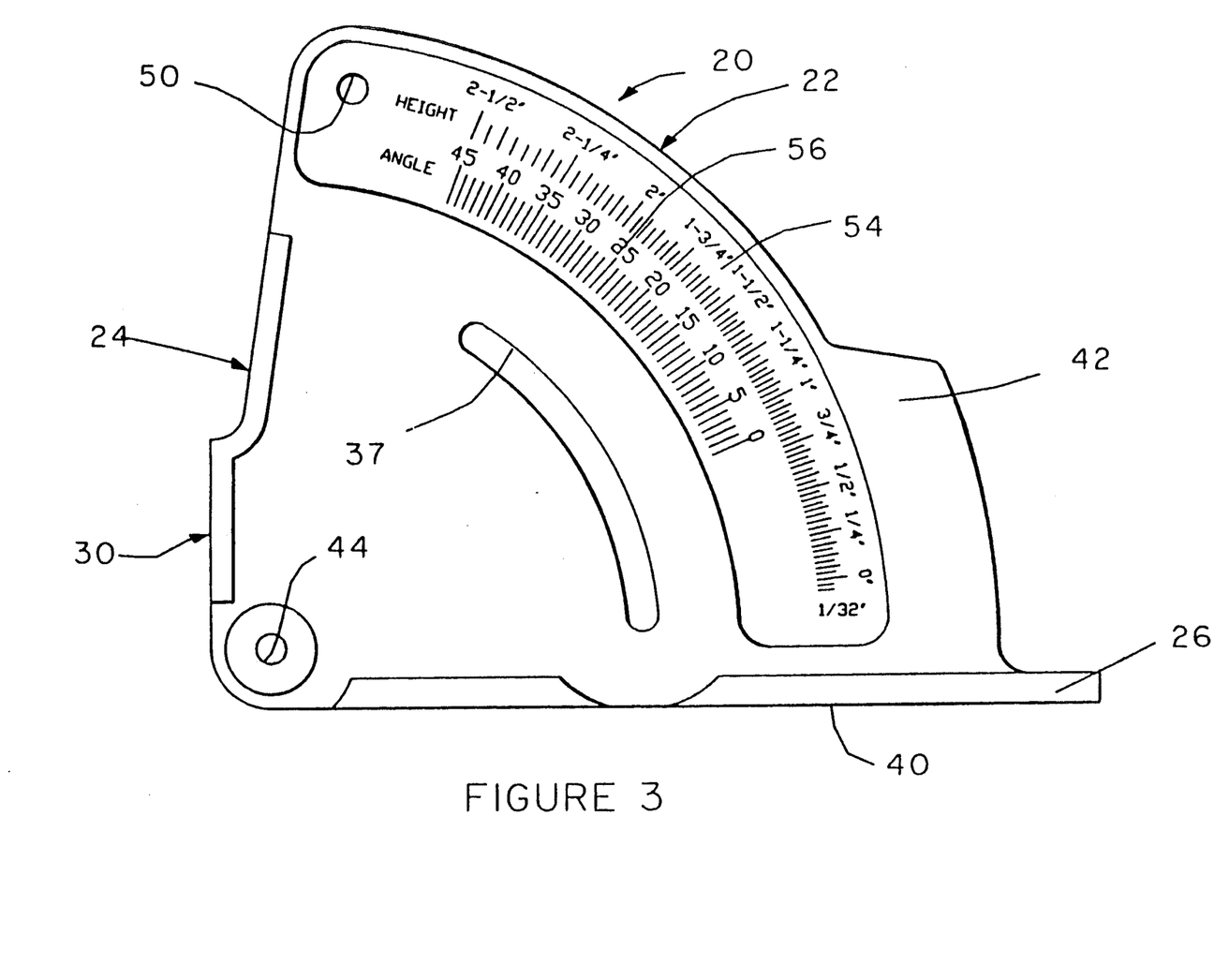
FIG. 3 is a front view of the body of the table saw gauge of FIG. 1.
Figure 4:
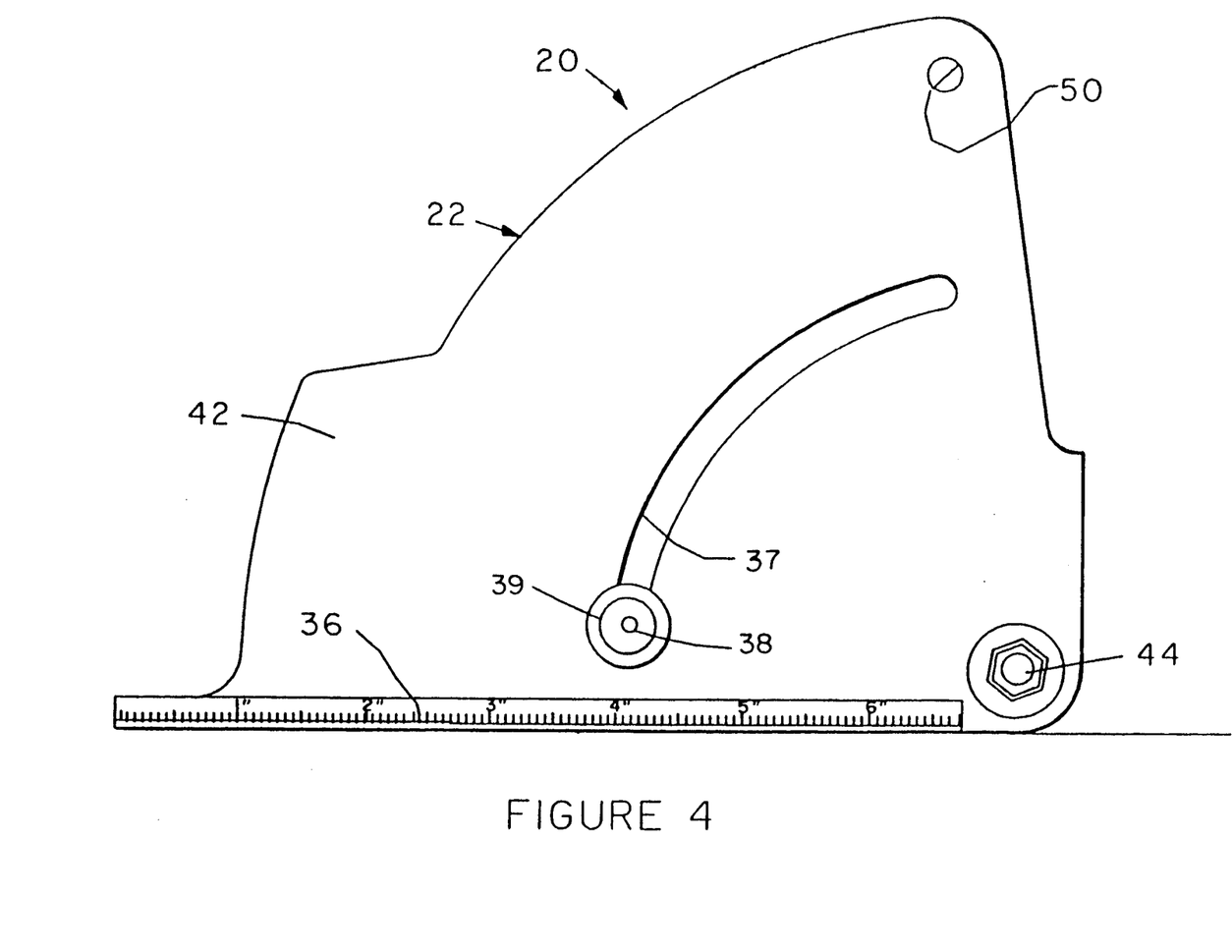
FIG. 4 is a back view of the body of the table saw gauge of FIG. 1.

Referring now to FIGS. 3 and 4, the body 22 of the table saw gauge 20 is illustrated in greater detail. The base 26 of the body 22 has a bottom or undersurface 40 adapted for engagement with the upper surface of the table top of the table saw to precisely position the table saw gauge 20 relative to the blade of the table saw. A handle portion 42 extends upwardly from the base 26 of the body 22. An aperture 44 is provided in the body 22 for use in pivotally supporting the blade 24 thereon.

Body 22 has desired scales 54 and 56 printed thereon. An aperture 50 is provided in the body 22. The first scale 54 adapted for cooperation with the first pointer 32 (FIG. 2) of the blade 24 in determining the height of the saw blade. In accordance with the preferred embodiment of the invention, the scale 54 is divided into 1/32 of an inch graduations; however, it will be understood that any desired graduation scheme may be utilized in the practice of the invention, including metric graduations. A second scale 56 is adapted for cooperation with the second pointer 34 (FIG. 2) of the blade 24 in determining the angle between the blade of a table saw and the table top. In accordance with the preferred embodiment of the invention, the scale 56 is graduated into one degree increments; however, it will be understood that any desired graduation scheme may be utilized in the scale 56, if desired.

The body 22 of the table saw gauge 20 is further illustrated in FIG. 4. The back of the body 22 may have instructions (not shown) printed thereon. The instructions may include such information as the manufacturer of the table saw gauge 20, as well as instructions as to the use thereof. The scale 36 is provided on the reverse side of the base 26 (FIG. 3) of the body 22.

Figure 5:
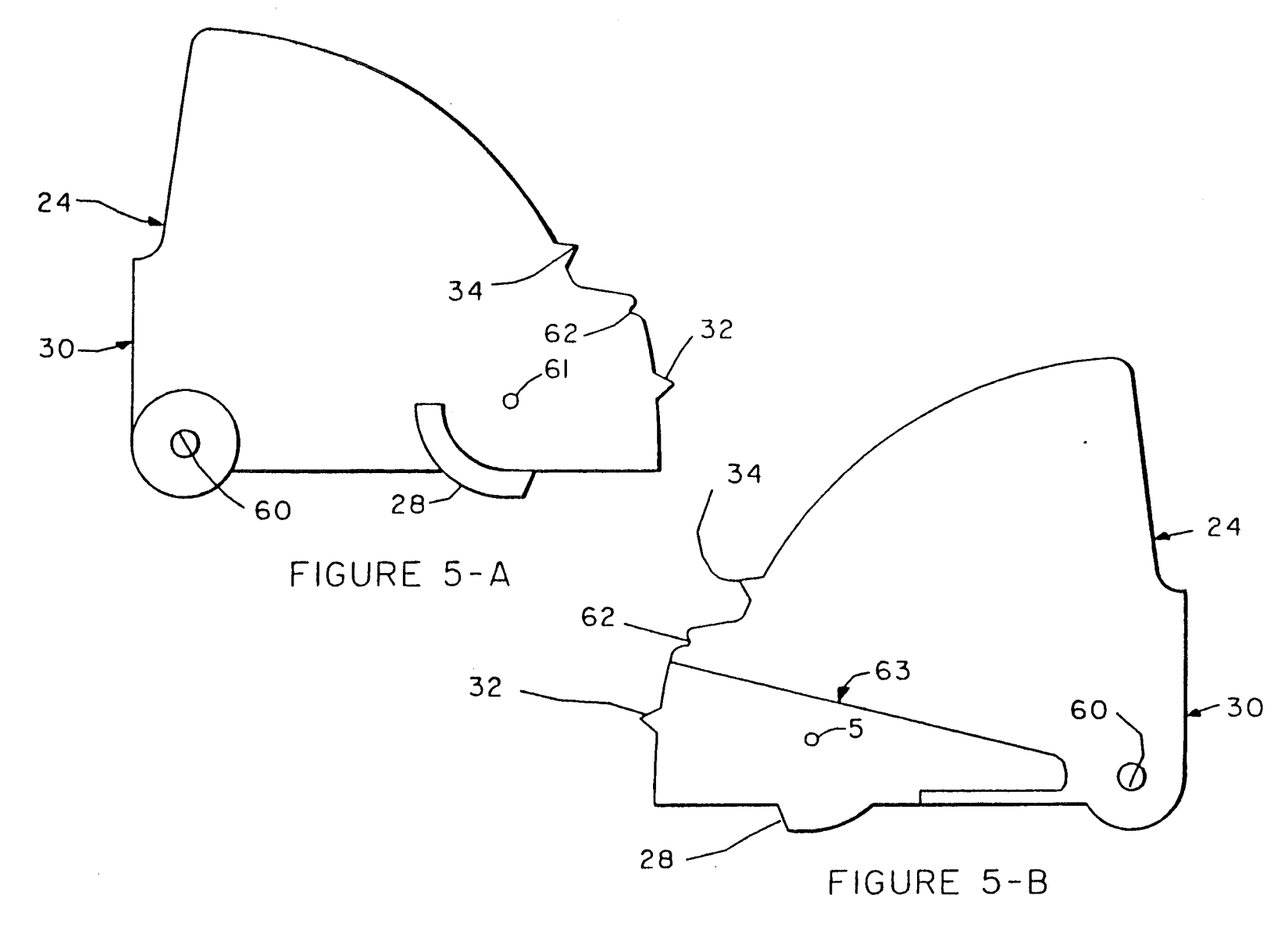
FIG. 5A is a front view of the blade of the table saw gauge of FIG. 1.
FIG. 5B is a back view of the blade of the table saw gauge of FIG. 1.

The blade 24 of the table saw gauge 20 is further illustrated in FIGS. 5A and 5B. The blade 24 is provided with an aperture 60 adapted to support the blade 24 on the body 22. An aperture 61 is provided for receiving the fastener 38. The pointers 32 and 34 are integrally formed with the other component parts of the blade 24. The blade 24 is provided with a notch 62 adapted to receive a tension spring to bias the blade 24 to pivot upwardly relative to the body 22. As shown in FIG. 5B, the blade 24 has an increase thickness 63, to ballast the table saw gauge 20.

Figure 6:
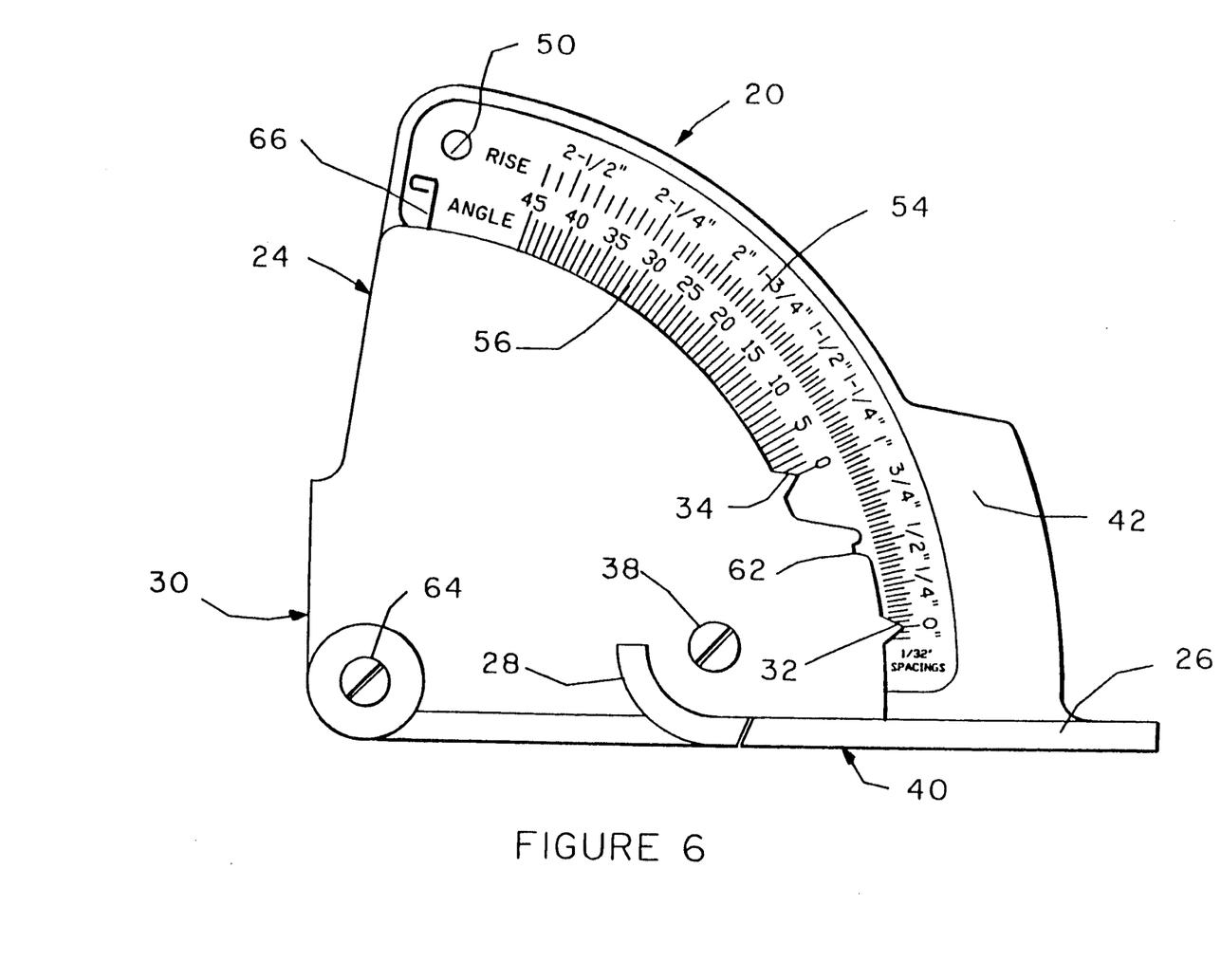
FIG. 6 is a front view of the table saw gauge as shown in FIG. 1.
Figure 7:
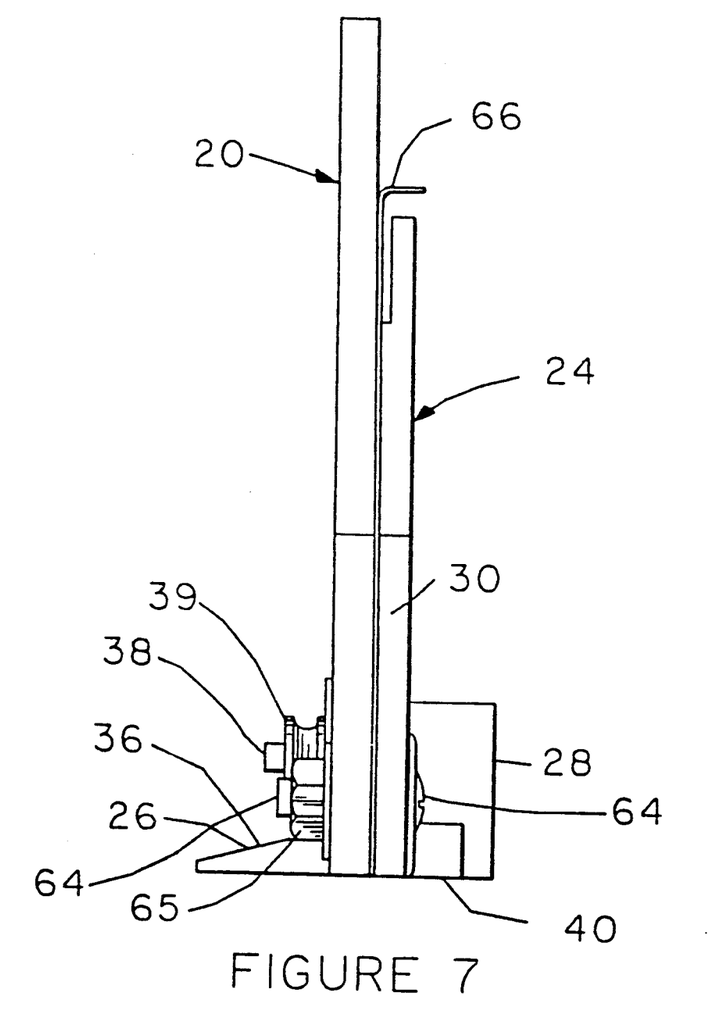
FIG. 7 is a left side view of the table saw gauge of FIG. 1.
Figure 8:
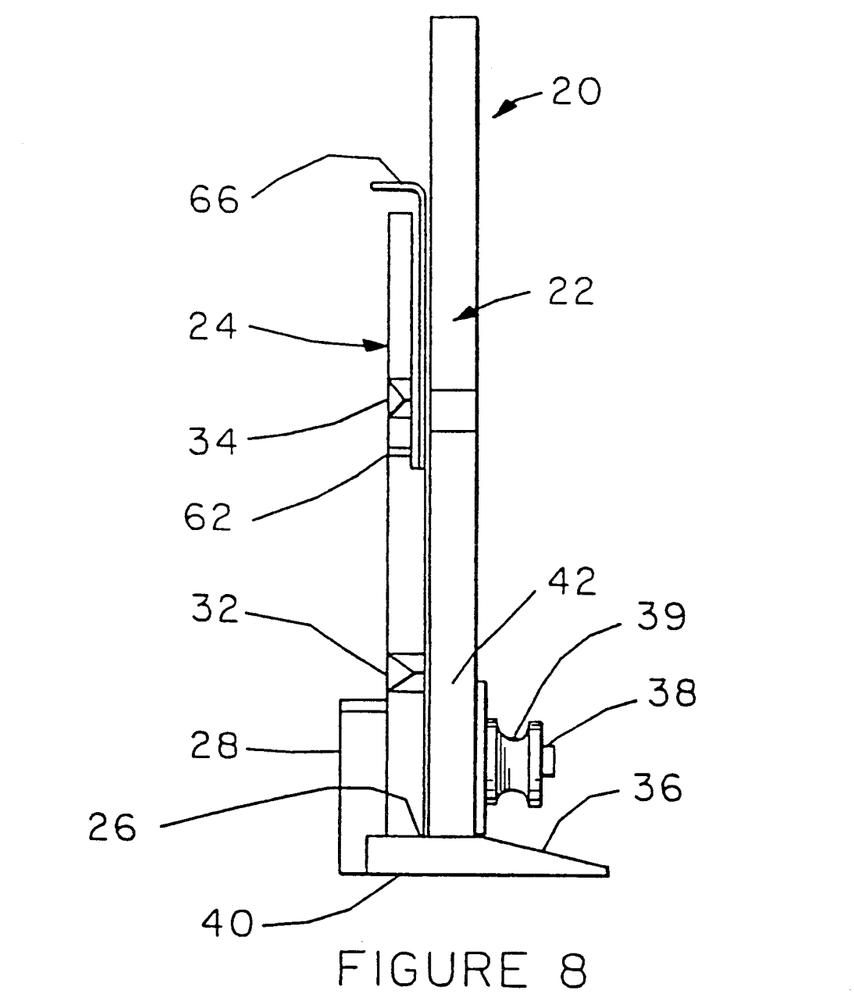
FIG. 8 is a right side view of the table saw gauge of FIG. 1.

Referring now to FIGS. 6, 7, and 8, the table saw gauge 20 of the present invention is shown in the fully assembled state. A bolt 64 extends through the aperture 60 of the blade 24 and the aperture 44 of the body 22 to pivotally support the blade 24 on the body 22. The bolt 64 is secured by a nut 65 (FIG. 7). A tension spring 66 is wrapped around the bolt 64 and includes a first leg (not shown) which engages the base 26 of the body 22. A second leg of the tension spring 66 extends angularly upwardly and is normally disengaged from the blade 24. Whenever it is desirable to bias the blade 24 to pivot upwardly relative to the body 22, the tension spring 66 is engaged with the notch 62, thereby biasing the blade 24 to pivot counterclockwise (FIG. 6) relative to the body 22.

OPERATION

The use of the table saw gauge 20 of the present invention is illustrated in FIGS. 9, 10, 11, and 12. A table saw TS includes a table top having an upper surface S which provides a reference plane for work pieces to be worked by the table saw TS. The table saw TS further includes a blade B which extends upwardly through the upper surface S of the table top for engagement with work pieces positioned thereon.

Figure 9:
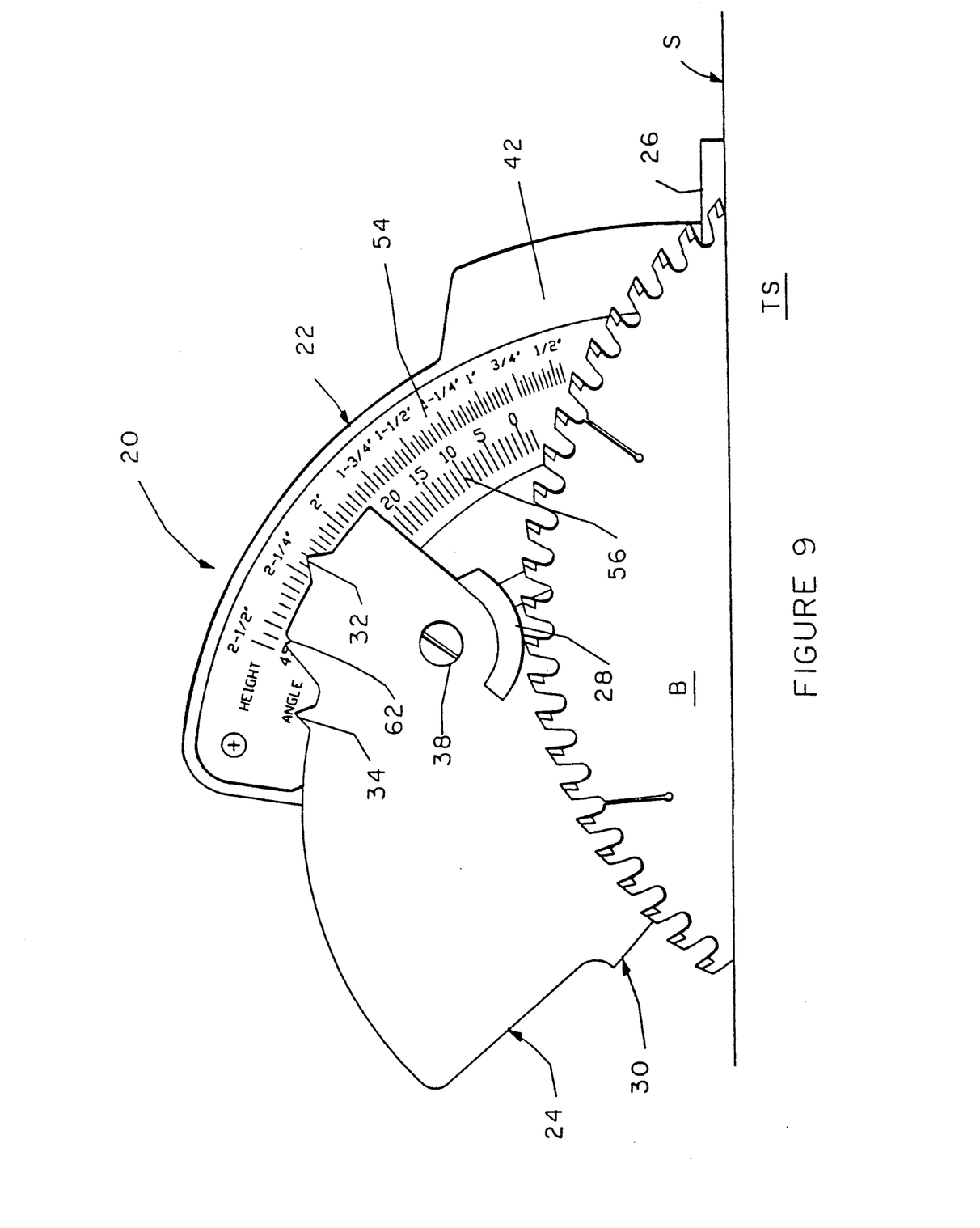
FIG. 9 is an illustration of the use of the table saw gauge of FIG. 1 to determine the blade height of a table saw blade.

The table saw gauge 20 is positioned on the upper surface S of the table top of the table saw TS by engaging the bottom or undersurface 40 of the base 26 of the body 22 with the surface S. The blade 24 is pivoted upwardly, and is then allowed to come into an engagement with the uppermost tooth of the blade B of the table saw TS. Pivotal movement of the blade 24 relative to the body 22 of the table saw gauge 20 causes the pointer 32 to move along the scale 54 of the body 22. When the armature 28 is engaged with the uppermost tooth of the blade B, the height of the blade B above the surface S of the table saw TS is indicated on the scale 54 at the tip of the pointer 32.

Figure 10:
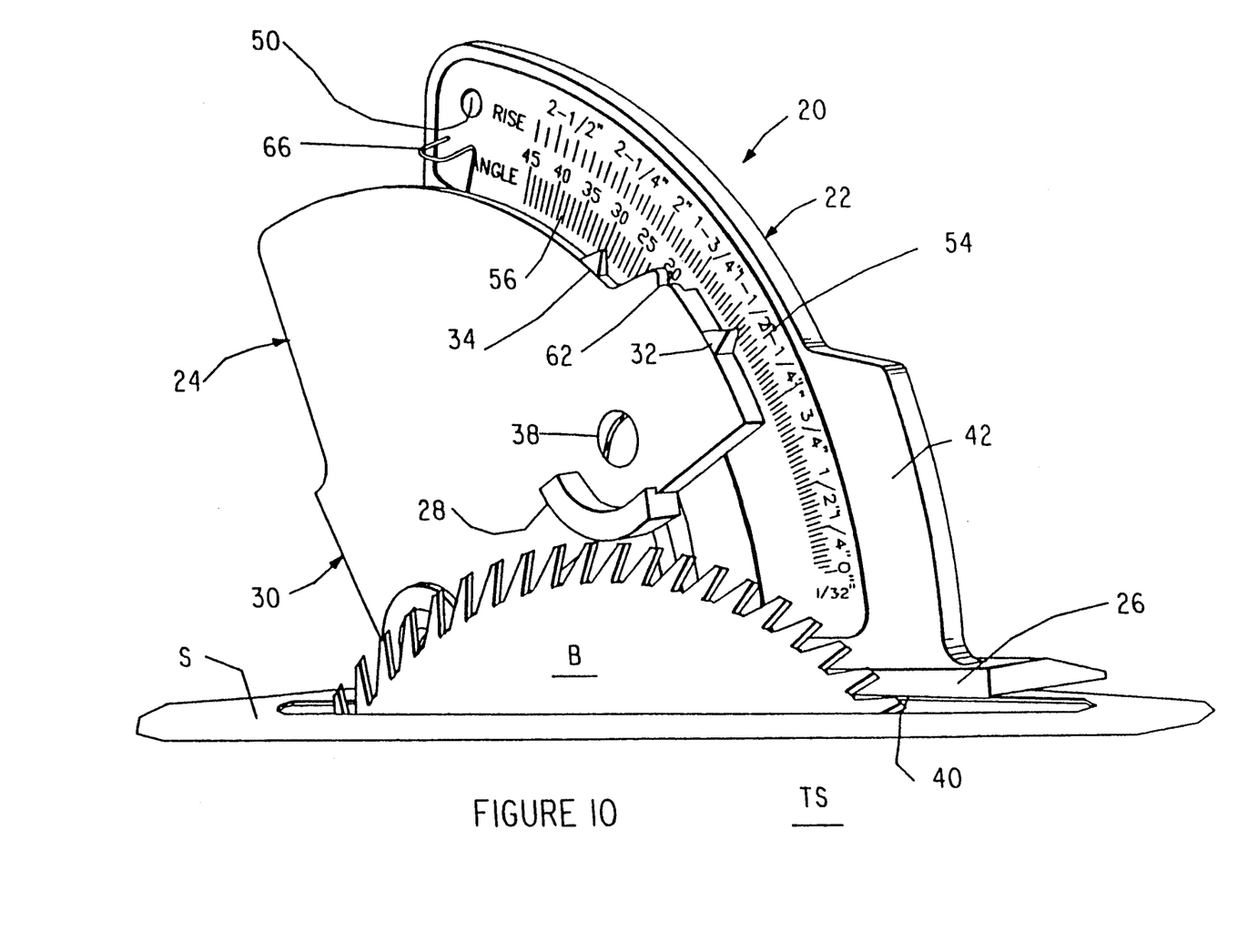
FIG. 10 is a perspective view similar to FIG. 9 showing the use of the table saw gauge to determine the blade height of a table saw blade.

FIG. 10 illustrates an alterative use of the table saw gauge 20. The blade 24 may be initially positioned relative to the body 22 by aligning the pointer 32 with a desired blade height as indicated on the scale 54 of the body 22, and then securing the blade 24 in the selected position by tightening the nut 39 (FIG. 4) on the threaded fastener 38. The armature 28 is then positioned above the blade B of the table saw TS. Using the adjustment apparatus of the table saw TS, the height of the blade B is raised until the uppermost tooth of the blade B engages the armature 28. At this point, the blade B is properly positioned at the desired height above the surface S of the table top of the table saw TS.

Figure 11:
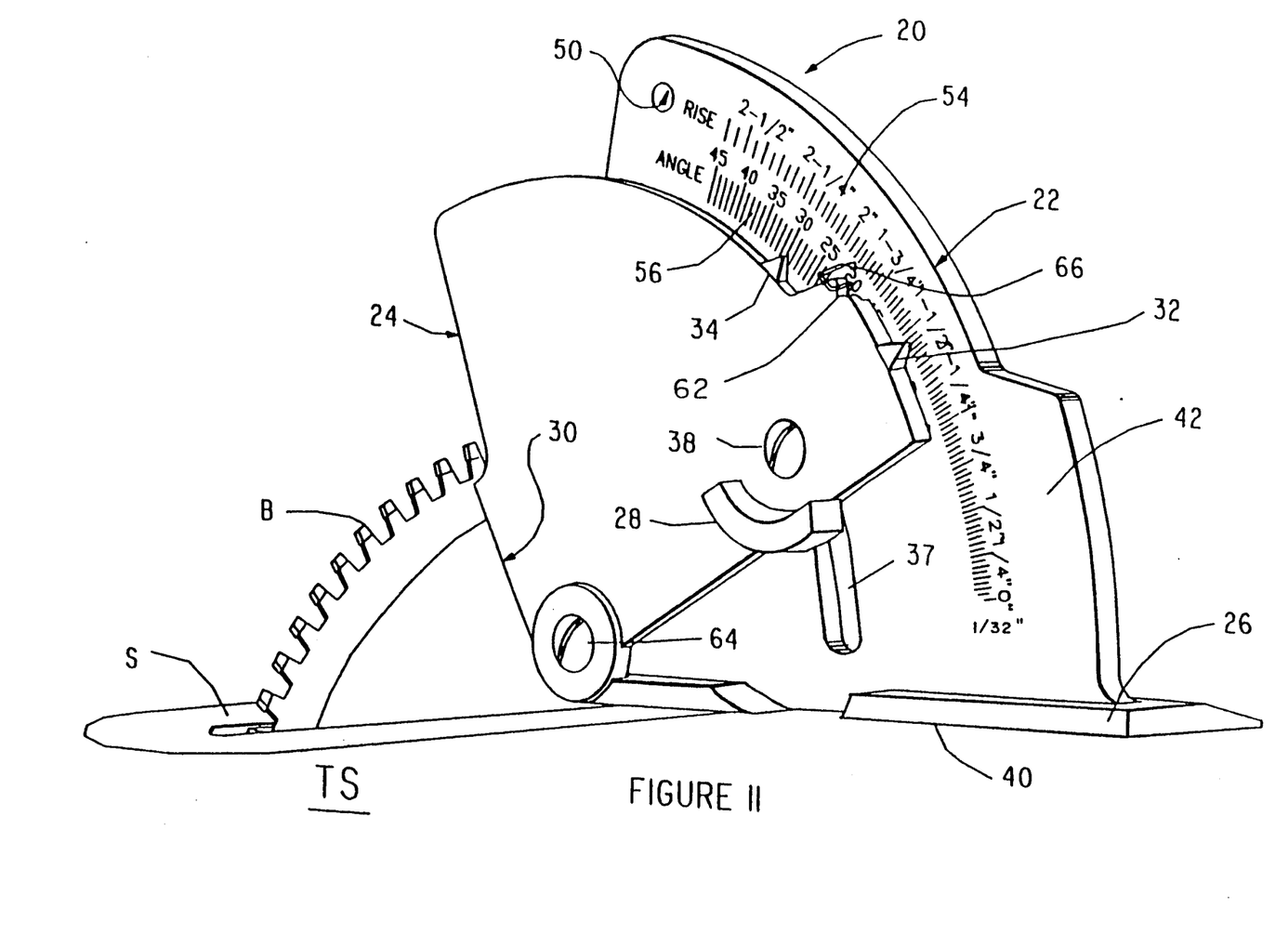
FIG. 11 is an illustration of the use of the table saw gauge of FIG. 1 to determine the blade angle of a table saw blade.

The use of the table saw gauge 20 in determining the angle between the blade B and the upper surface S of the table top of the table saw TS is illustrated in FIG. 11. Again, the table saw gauge 20 is positioned perpendicular to the blade B by engaging the bottom or undersurface 40 of the base 26 with the surface S. The table saw gauge 20 is positioned perpendicular to the blade B, and the blade 24 of the gauge 20 is pivoted upwardly until the armature 30 engages the side of the blade B. Pivotal movement of the blade 24 relative to the body 22 causes the pointer 34 to move until the armature 30 engages the side of the blade B. The angular relationship between the blade B and the surface S of the table saw TS is then read from the scale 56 at the tip of the pointer 34.

In certain instances it is desireable to bias the blade 24 of the table saw to pivot upwardly prior to engaging the armature 30 with the blade B. For example, it may be desirable to allow the operator to adjust the angular relationship between the blade B and the surface S while using the table saw gauge 20 to determine the angular relationship. In such instances the tension spring 66 is pivoted downwardly and is engaged with the notch 62. At this point, the spring 66 biases the blade 24 of the table saw gauge 20 to pivot counterclockwise (FIG. 11). As the armature 30 of the blade 24 is engaged with the blade B of the table saw TS, the blade 24 is caused to pivot relative to the body 22 against the action of the spring 66. Pivotal movement of the blade 24 continues until the blade B is located in the proper angular relationship relative to the surface S as indicated by the pointer 34 in cooperation with the scale 56.

Figure 12:
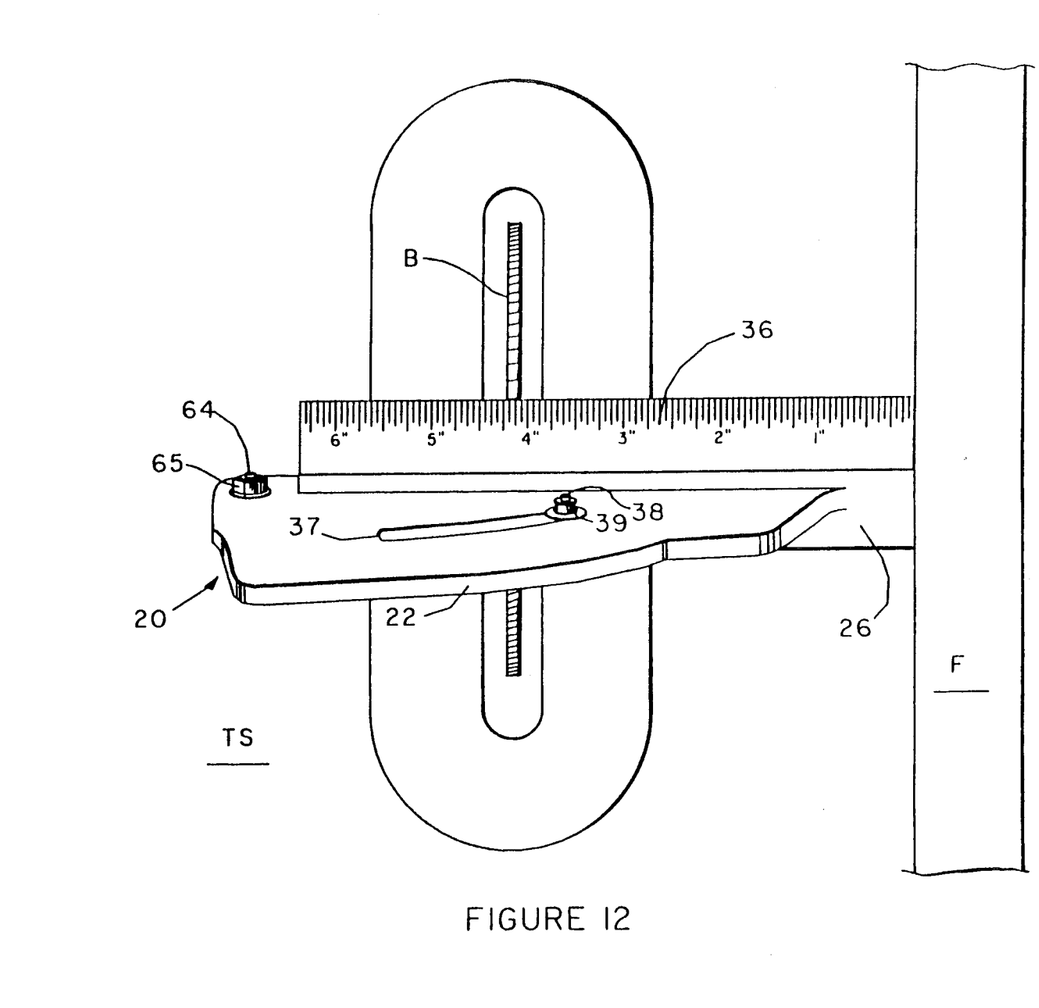
FIG. 12 is an illustration of the use of the table saw gauge of FIG. 1 to determine the distance between a table saw blade and an adjacent fence or guide.

As is well known, most table saws are provided with a fence or guide useful in maintaining a predetermined relationship between the work piece and the blade B of the table saw TS. Referring to FIG. 12, a fence F extends adjacent and parallel to the blade B of the table saw TS. The scale 36 on the base 26 of the body 22 of the table saw gauge 20 may be utilized to accurately determine the distance between the fence F and the blade B.

Although preferred embodiments of the invention have been illustrated in the accompanying Drawings and described in the foregoing Detailed Description, it will be understood that the invention is adapted for rearrangement and variation of the various component parts and elements thereof without departing from the spirit of the invention.

I claim:

1. A table saw gauge comprising:
    a body including a base having an undersurface for engaging the upper surface of the table top of a table saw;
    first and second scales mounted on the blade for use in determining saw blade height and saw blade angle, respectfully;
    a blade having a first armature for engaging the teeth of a saw blade to determine saw blade height and having a second armature for engaging the side of a saw blade for determining saw blade angle;
    first and second pointers mounted on the blade for cooperation with the first and second scales mounted on the body to determine saw blade height and saw blade angle, respectively; and
    means pivotally supporting the blades on the body.

2. The table saw gauge according to claim 1 wherein the means or pivotally supporting the blade on the body comprises aligned apertures formed in the blade and the body and a fastener extending through the aligned apertures.

3. The table saw gauge according to claim 2 further including a tension spring wound around the fastener which pivotally supports the blade on the body and having a first leg engaging the body and a second leg selectively engageable with the blade for biasing the blade to pivot relative to the body.

4. The table saw gauge according to claim 1 further including means for selectively securing the blade in a predetermined pivotal relationship relative to the body.

5. The table saw gauge according to claim 4 wherein the securing means comprises a fastener mounted on the blade for pivotal movement therewith and extending through an arcuate aperture formed in the body for selectively securing the blade against pivotal movement relative to the body.

6. The saw gauge according the claim 1 further including a third scale formed on the body for use in determining the distance between the saw blade and an adjacent fence.

7. The table saw gauge according to claim 1 further including spring means mounted on the body and selectively engageable with the blade for biasing the blade to move pivotally relative to the body.

8. A table saw gauge comprising:
    a body including a base comprising an undersurface for engagement with the upper surface of the table top of a table saw to position the table saw gauge;
    a first scale mounted on the base of the body for use in determining the distance between a table saw blade and an adjacent fence;
    a second scale mounted on the body for use in determining the height of the table saw above the table top of the table saw;
    a third scale mounted on the body for use in determining the angle between the table saw blade and the table top of the table saw;
    a blade including a first armature for engaging the uppermost tooth of the blade of the table saw to determine the height of a blade above the table top of the table saw and a second armature for engaging the side of the blade of the table saw to determine the angle between the blade and the table top of the table saw;
    a first pointer mounted on the blade for cooperation with the second scale mounted on the body to indicate the height of the table saw blade above the table top of the table saw;
    a second pointer mounted on the blade for cooperation with the third scale mounted on the body to determine the angle between the blade and the table top of the table saw;
    the body and the blade having aligned apertures;
    a fastener extending through the aligned apertures of the body and the blade for pivotally supporting the blade on the body;
    a second fastener mounted on the blade for pivotal movement therewith; and
    an arcuate aperture formed in the body and having a second fastener extending therethrough for cooperation with the second fastener to selectively secure the blade in a predetermined angular relationship relative to the body.

9. The table saw gauge according to claim 8 further including spring means mounted on the body and selectively engageable with the blade for biasing the blade to pivot relative to the body.

* * * * *